United States Patent [19]

Berkey

[11] Patent Number: 4,578,097
[45] Date of Patent: Mar. 25, 1986

[54] METHOD OF FORMING A POLARIZATION PRESERVING OPTICAL WAVEGUIDE

[75] Inventor: George E. Berkey, Pine City, N.Y.
[73] Assignee: Corning Glass Works, Corning, N.Y.
[21] Appl. No.: 535,466
[22] Filed: Sep. 26, 1983
[51] Int. Cl.[4] .................................. C03B 25/02
[52] U.S. Cl. ................................ 65/3.11; 65/13; 65/18.2; 65/61
[58] Field of Search ............... 65/3.11, 3.12, 13, 18.2, 65/61; 350/96.33

[56] References Cited

U.S. PATENT DOCUMENTS

| | | | |
|---|---|---|---|
| 4,179,189 | 12/1979 | Kaminow et al. | 350/96.33 |
| 4,274,854 | 6/1981 | Pleibel et al. | 65/2 |
| 4,310,339 | 1/1982 | Blankenship | 65/18.2 |
| 4,354,736 | 10/1982 | Maklad et al. | 65/3.11 |
| 4,360,371 | 11/1982 | Blankenship et al. | 65/3.12 |
| 4,453,961 | 6/1984 | Berkey | 65/18.2 |

FOREIGN PATENT DOCUMENTS

| | | | |
|---|---|---|---|
| 2012983 | 8/1979 | United Kingdom | 65/3.12 |
| 2104239 | 3/1983 | United Kingdom . | |
| 2104241 | 3/1983 | United Kingdom . | |

Primary Examiner—S. Leon Bashore
Assistant Examiner—Michael K. Boyer
Attorney, Agent, or Firm—W. J. Simmons, Jr.

[57] ABSTRACT

A single-mode optical waveguide is constructed in a manner such that the core thereof is subjected to a stress-induced birefringence. A coating of core glass soot is deposited on the surface of a cylindrical mandrel, and a coating of inner cladding glass soot is deposited on the core glass soot. The mandrel is removed and the resultant porous preform is consolidated to form a hollow dense glass preform. The preform aperture is closed at both ends. Diametrically opposed slabs are removed from the inner cladding region of the consolidated preform. The resultant article is evacuated, heated and stretched to close the aperture and form a preform foreproduct having two opposed rounded sides and two opposed flattened sides. The foreproduct is coated with a layer of outer cladding glass soot having a thermal coefficient of expansion which differs from that of the inner cladding glass by at least $1 \times 10^{-7}$/°C. The resultant composite structure is consolidated to form a draw blank which can be drawn into an optical fiber.

12 Claims, 11 Drawing Figures

METHOD OF FORMING A POLARIZATION PRESERVING OPTICAL WAVEGUIDE

BACKGROUND OF THE INVENTION

In many applications of single-mode optical waveguides, e.g. gyroscopes, sensors and the like, it is important that the propagating optical signal retain the polarization characteristics of the input light in the presence of external depolarizing perturbations. The rotation of the polarization plane of a propagating signal can be prevented or reduced by employing a fiber that is birefringent, i.e. the refractive index of the core thereof is different for two orthogonally polarized light waves.

The polarization performance of a single-mode fiber can be characterized by its beat length L, where L is defined as $2\pi/\Delta\beta$, and $\Delta\beta$ is the difference in the propagation constants of the two polarizations.

The inventions disclosed in U.S. Pat. Nos. 4,179,189 and 4,274,854 are based upon the recognition that orthogonally polarized waves are more efficiently decoupled in a waveguide that is fabricated in such a manner as to deliberately enhance stress-induced, or strain birefringence. Those patents teach that such behavior is accomplished by introducing a geometrical and material asymmetry in the preform from which the optical fiber is drawn. The strain-induced birefringence is introduced by at least partially surrounding the single mode waveguide by an outer jacket having a different thermal coefficient of expansion (TCE) than that of the waveguide and a thickness along one direction that is different from its thickness along a direction orthogonal to the one direction. This type of fiber has been formed by first depositing within a silica tube a layer of inner cladding material and then a layer core material. Either before or after collapsing the resultant tubular preform to eliminate the central hole, diametrically opposed portions of the outer surface of the tube are ground flat. During the fiber drawing operation, the outer cladding of the drawn fiber will assume a round cross-section, whereas the inner cladding becomes elliptical. The minimum thickness of the elliptically-shaped inner cladding, when formed in this manner, is insufficient to obtain the desired stress on the core.

The aspect ratio of the inner cladding can be increased somewhat by employing the method of U.S. Pat. No. 4,360,371 wherein a tubular intermediate product may be formed by a chemical vapor deposition (CVD) technique whereby one or more layers are deposited on the inner surface of substrate tube. The innermost layer forms the core and at least one of the other layers, which is thicker than the core layer, forms the inner cladding. In another embodiment thereof, the tubular intermediate product is formed by a flame oxidation technique. Reactant vapors are fed to a burner where they are oxidized in a flame to form glass soot which is deposited on a cylindrical mandrel. The first applied soot layer forms the core material of the resultant fiber. At least one additional layer of soot is applied to the first layer to form the inner cladding. After the mandrel is removed, the resultant hollow soot preform is consolidated to form a tubular intermediate product. The intermediate product formed by either of these processes is collapsed to a flattened preform foreproduct wherein the core glass has been transformed into a unitary layer having an elongated cross-section. This core layer is surrounded by an inner cladding layer which now has an oblong cross-sectional configuration. A layer of flame hydrolysis-produced soot is deposited on the outer surface of the inner cladding layer, the TCE of the soot being different from that of the inner cladding glass. The resultant article is heated to consolidate the soot into an outer cladding glass layer, thereby forming a solid glass draw blank which can be drawn into an optical waveguide fiber.

Some disadvantages of the aforementioned prior art are as follows. When a substrate tube forms a part of an optical fiber near the core, fiber attenuation can be adversely affected because of the amount of impurities contained in such a substrate tube as compared with glass that is vapor deposited. Also, most prior art processes result in an oblong core, a feature which can render the splicing of fibers more difficult. Furthermore, it is difficult to employ these prior art methods to form fibers in which minimum inner cladding thickness is extremely small. As the minimum inner cladding thickness approaches zero, the stress which can be applied to the core increases, thereby increasing the polarization retaining capacity of the fiber.

SUMMARY OF THE INVENTION

It is an object of the present invention to provide a method of making a single-mode optical fiber having excellent polarization-preserving characteristics. Another object is to provide a method of making a polarization maintaining single-mode optical fiber by a technique that also results in low attenuation operation. A further object is to provide a method of making a polarization maintaining single-mode optical fiber of the type comprising an oblong inner cladding surrounding the core, the fabrication technique enabling the minimum thickness of the inner cladding to approach zero.

Single-mode optical fibers having polarization-retaining characteristics have previously been formed by providing a preform foreproduct having a centrally disposed glass core surrounded by a layer of inner cladding glass having a refractive index lower than that of the core glass. The preform foreproduct has two opposed rounded sides and two opposed flatter sides. Deposited on the outer surface of the inner cladding layer is a layer of glass particles having a thermal coefficient of expansion which differs from that of the inner cladding layer by at least $1 \times 10^{-7}/°C$. The resultant article is heated to consolidate the layer of glass particles, thereby forming a solid glass draw blank which is drawn to form a polarization retaining single-mode optical fiber.

In accordance with the present invention, a preform foreproduct having a substantially circular core is formed by initially forming a solid glass preform having a circular core surrounded by a layer of inner cladding glass having a circular cross-sectional configuration. Diametrically opposed regions of the inner cladding glass are removed, whereby its cross-sectional configuration changes to one having two rounded sides and two flattened sides.

In a preferred embodiment the preform foreproduct is formed by depositing a coating of core glass particles on a substantially cylindrical mandrel. A coating of inner cladding glass particles is deposited on the core glass coating. The mandrel is removed, and the resultant hollow, porous preform is consolidated. Diametrically opposed slabs are removed from the consolidated preform which is then heated and stretched to close the central aperture and form an elongated preform foreproduct.

DESCRIPTION OF THE PREFERRED EMBODIMENT

It is to be noted that the drawings are illustrative and symbolic of the invention, and there is no intention to indicate scale or relative proportions of the elements shown therein.

Numerous references are made herein to my copending U.S. patent applications Ser. No. 402,056 "Method of Making Glass Optical Fiber" filed July 26, 1982, now U.S. Pat. No. 4,453,961, and Ser. No. 427,525 "Devitrification Resistant Flame Hydrolysis Process" filed Sept. 29, 1982.

The present invention pertains to a method of making single-polarization, single-mode optical waveguide fibers. In accordance with the present method, the preform from which such a fiber is drawn is formed entirely by a CVD process. Thus, an extremely low attenuation can be achieved. It will also become apparent that the present method enables the achievement of greater birefringence in fibers of the type which employ an oblong inner cladding to obtain a stress optic effect.

Figure 1:
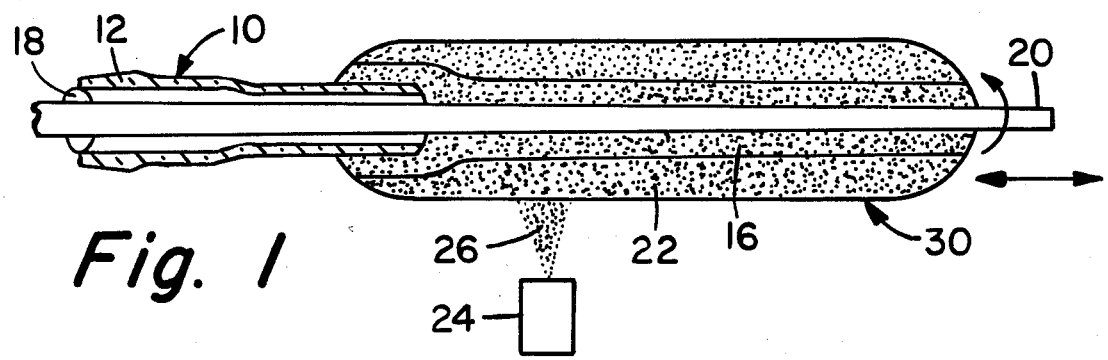
FIGS. 1 and 2 illustrate the application of successive coatings of glass soot to a mandrel.
Figure 2:
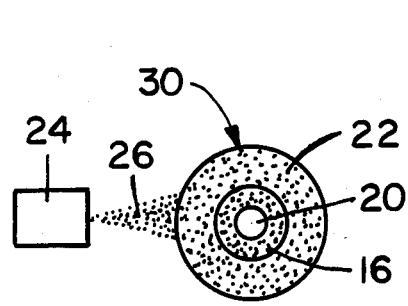

A porous preform may be formed in accordance with the method illustrated in FIGS. 1 and 2. A handle 10 of the type disclosed in U.S. Pat. No. 4,289,522 may be employed. Handle 10 is a tubular member having a ground glass joint 12 at one end thereof. The large diameter end of a tapered mandrel 20 extends through handle 10 and is secured thereto by shims 18. The ends of the mandrel are mounted in a lathe where it is rotated and translated as indicated by the arrows. The mandrel may be initially coated with carbon soot to facilitate removal of the soot preform.

Fuel gas and oxygen or air are supplied to burner 24 from a source (not shown). This mixture is burned to produce a flame which is emitted from the burner. A gas-vapor mixture is oxidized within the flame to form a soot stream 26 which is directed toward mandrel 20. Suitable means for delivering the gas-vapor mixture to the burner are well known in the art; for an illustration of such means reference is made to U.S. Pat. Nos. 3,826,560, 4,148,621 and 4,173,305. One or more auxiliary burners (not shown) may be employed to direct a flame toward one or both ends of the soot preform during deposition to prevent breakage. This method can be employed to produce any type of core index profile including step index and gradient index. For an illustration of suitable burners, reference is made to U.S. Pat. Nos. 3,565,345 and 4,165,223 and to my copending application Ser. No. 427,525. Said application shows a burner wherein a centrally located orifice in the burner face is surrounded by three rings of orifices. The reactant compounds emanate from the central orifice where they are subjected to heat from a flame produced by a fuel gas and oxygen emanating from the middle ring of orifices. A stream of oxygen, referred to as the inner shield, emanates from the inner ring of orifices; this steam prevents reaction of the reactant compounds at the burner face. Finally, a stream of oxygen referred to as the outer shield emanates from the outer ring of orifices. This burner design is somewhat similar to that disclosed in U.S. Pat. No. 3,698,936 issued to H. J. Moltzan, the Moltzan patent differing in that it teaches an annular slot for providing the inner shield and in that it lacks the outer shield orifices. All of the orifices of the burner are supplied by manifolds in a manner similar to that taught in the Moltzan patent.

Soot deposition means 24 may also comprise nozzles such as those disclosed in U.S. Pat. No. 3,957,474 which emit reactant vapors which are heated by means such as a laser beam to form a soot stream.

A first coating 16 of core soot is applied to mandrel 20 while it is rotated and translated for uniform deposition of the soot. Generally, each coating of glass soot is formed of a plurality of layers of soot, each layer being formed by a single pass of the burner along the length of rod 20. To form a gradient index core, each layer has a progressively lower index of refraction as taught in U.S. Pat. No. 3,823,995. A second coating 22 of glass soot may be applied over the outside peripheral surface of first coating 16. Since the fiber ultimately produced by the method of this invention includes an outer cladding referred to as a stress cladding, coating 22 forms a cladding referred to as the inner cladding.

In accordance with well known practice the refractive index of coating 22 is made lower than that of coating 16 by changing the composition of the soot being produced in flame 26. This can be accomplished by changing the concentration or type of dopant material being introduced into the flame, or by omitting the dopant material. Mandrel 20 is again rotated and translated to provide a uniform deposition of coating 22. The composite structure including first coating 16 and second coating 22 constitutes a preliminary soot preform 30.

In the manufacture of optical waveguides, the materials of the core and cladding of the waveguide should be produced from a glass having minimum light attenuation characteristics, and although any optical quality glass may be used, fused silica is a particularly suitable glass. For structural and other practical considerations, it is desirable for the core and cladding glasses to have similar physical characteristics. Since the core glass must have a higher index of refraction than the cladding for proper operation, the core glass may desirably be formed of the same type of glass used for the cladding and doped with a small amount of some other material to slightly increase the refractive index thereof. For example, if pure fused silica is used as the cladding glass, the core can consist of fused silica doped with a material to increase its refractive index.

There are many suitable materials that can satisfactorily be used as a core dopant alone or in combination with each other. These include, but are not limited to, titanium oxide, tantalum oxide, tin oxide, niobium oxide, zirconium oxide, aluminum oxide, lanthanum oxide, phosphorus oxide and germanium oxide.

In addition to having a refractive index lower than the core, the inner cladding glass must have a TCE that is sufficiently different from that of the outer, stress cladding glass that the core is subjected to a anisotropic stress sufficient to induce an effective amount of birefringence. Suitable combinations of materials for the inner cladding and the stress cladding will be discussed below.

After deposition of particulate soot material to the extent required to form preliminary soot preform 30, mandrel 20 may be removed from the assembly by pulling it out through handle 10, thereby leaving a longitudinal aperture. Integral handle 10 provides a support for subsequent handling and processing.

The ground glass joint portion of handle 10 is secured into a complimentary female ground glass joint member, whereby drying gas may be flowed through handle 10, into the preform aperture and outwardly through the preform interstices. The steps of drying and consolidating may be performed in accordance with the teachings of U.S. Pat. No. 4,125,388, which patent is hereby expressly incorporated by reference. As taught by said patent, drying may be accomplished before or during the consolidation step.

Drying can be facilitated by inserting a short section of capillary tubing into that end of the porous preform aperture opposite handle 10 as disclosed in my copending application Ser. No. 427,525.

Figure 3:
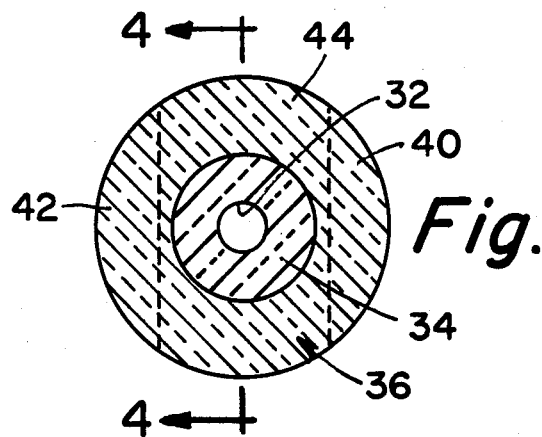
FIG. 3 is a cross-sectional view of a consolidated glass preform.
Figure 4:
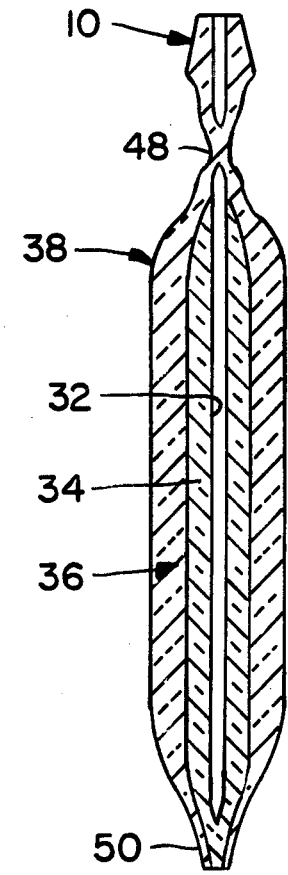
FIG. 4 is a cross-sectional view taken along lines 4—4 of FIG. 3.

After consolidation, aperture 32 of preliminary, consolidated preform 38 usually remains open as shown in FIGS. 3 and 4. Core soot 16 consolidates to form core glass 34, and cladding soot 22 forms cladding glass 36. Aperture 34 must close during some subsequent high temperature process step. For example, if an aperture is present in a blank which is being drawn into an optical fiber, the aperture can be caused to close by drawing at a sufficiently low rate. It is noted that the relative viscosities of the glasses which form the inner and outer portions of the draw blank also affect the ease with which the aperture closes during draw. When the aperture remains until the fiber drawing step, the tubular preform should be acid rinsed prior to drawing to remove any impurities that may have deposited on the aperture-forming surface, unless the ends of the aperture have been closed.

If the preform aperture remains after consolidation, the infiltration of impurities can be prevented by closing off ends 48 and 50 of the aperture during or immediately following consolidation as taught in my aforementioned copending applications. In accordance with my application Ser. No. 402,056, the aperture may be acid etched prior to closing the ends thereof to remove a devitrified layer which has formed on the aperture-forming surface of the consolidated preform. In accordance with the teachings of my application Ser. No. 427,525, an improved soot laydown technique prevents devitrification of the aperture-forming surface of the preform, and etching of that surface therefore becomes unnecessary. Both of said copending applications teach that end 50 of the preform aperture is initially closed. If a capillary tube is inserted into that end of the soot preform, end 50 will close during consolidation. If no such plug is employed the entire aperture will remain open. In this event ends 48 and 50 are closed after consolidation by a technique such as heating and pinching the same.

Figure 5:
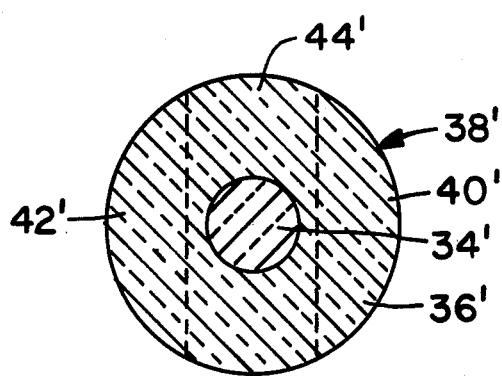
FIG. 5 is a cross-sectional view of a consolidated preform having no longitudinal aperture therein.

The aperture can be closed during the consolidation process as shown in FIG. 5 wherein elements similar to those of FIG. 3 are represented by primed reference numerals. To achieve aperture closing during consolidation, the viscosity of core glass soot 16 must be sufficiently lower than cladding glass soot 22 as taught in U.S. Pat. No. 4,251,251. Furthermore, to reduce the occurrence of seeds along the centerline of the consolidated preform a thin stratum of low viscosity glass soot, preferably containing $P_2O_5$, is initially applied to the mandrel as taught in U.S. Pat. No. 4,298,365.

The consolidated preform of FIG. 5 can also be formed by an axial vapor deposition process such as those disclosed in U.S. Pat. Nos. 3,957,474 and 4,231,774, for example. Such axial techniques may be employed to produce an aperture-free soot preform which can be consolidated to form an aperture-free preliminary consolidated preform.

Indeed, any CVD technique capable of forming a high purity preliminary consolidated preform having a glass core surrounded by a layer of cladding glass, is suitable for purposes of the present invention. For example, layers of cladding glass and core glass can be formed on the inner surface of a substrate tube in accordance with the teachings of U.S. Pat. No. 4,298,364. After the coated tube has been collapsed, the substrate tube can be removed by etching, thereby leaving a preliminary consolidated preform, the core and cladding of which have been formed by vapor deposition.

Figure 6:
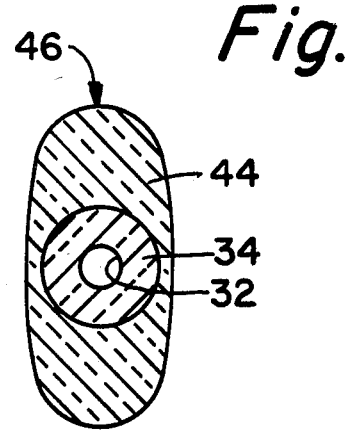
FIG. 6 is cross-sectional view of an oblong preform foreproduct.

Two diametrically opposed, longitudinally-extending surface regions 40 and 42 are removed from inner cladding glass 36 by any suitable technique such as sawing, grinding, or the like. The boundaries between the removed glass and the remaining inner cladding glass 44 are represented in FIGS. 3 and 5 by dashed lines. After removing regions 40 and 42, the flat surfaces of cladding glass 44 must be ground and polished. As shown in FIG. 6, the edges of the remaining inner core 44 may be rounded. Since the step of rounding the sharp edges is optional, the resultant preform foreproduct may have either rounded or sharp edges. The configuration of the preform foreproduct carries over into the resultant fiber. Whether the inner cladding of the resultant optical fiber has rounded or sharp "edges" is thought to have little or no effect on its optical performance. However, a rounded preform foreproduct may be more desirable from the standpoint of applying outer cladding soot thereto, since there should be less turbulence of the soot stream caused by a rounded preform. The resultant article may be etched to remove a thin layer from the surface thereof.

Preform foreproduct 46 must eventually be provided with an outer layer of stress cladding glass, the outer surface of which is substantially circular in cross-section. The surface of foreproduct 46 is prepared in a conventional manner prior to deposition of the outer cladding. The surface of preform foreproduct 46 can be kept clean after the polishing step which resulted in the outer surface of inner cladding 44 by inserting foreproduct 46 into a clean sealed bag such as a polyethylene bag. If foreproduct 46 is handled or permitted to become dirty, several cleaning steps are typically required. It is washed in deionized water and then washed in an isopropyl alcohol bath. It is then etched in HF to remove a few microns of glass or about 1% of the article weight. Then foreproduct 46 is rinsed in deionized water, degreased with isopropyl alcohol and placed in a clean polyethylene bag. Soot of the desired glass composition is deposited on foreproduct 46 by a conventional flame hydrolysis process similar to that disclosed in U.S. Pat. Nos. 3,737,292 and 4,165,223.

Prior to the deposition of outer cladding soot on foreproduct 46 it is preferred that the consolidated preform be first drawn into an intermediate, large diameter fiber or rod in accordance with the teachings of my aforementioned copending applications, whereby the aperture is simultaneously closed.

Figure 7:
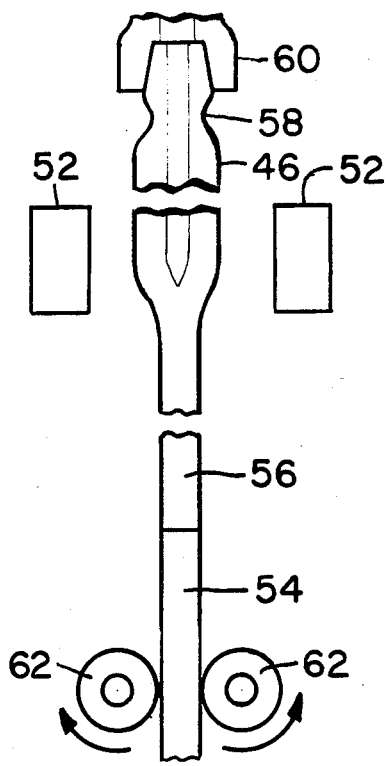
FIG. 7 is a schematic diagram illustrating the drawing of a rod or intermediate fiber from the preform.

The intermediate fiber can be formed in a conventional draw furnace wherein the tip of the consolidated preform from which the intermediate fiber is being drawn is heated to a temperature which is slightly lower than the temperature to which the preform would be subjected to draw optical fiber therefrom. A temperature of about 1900° C. is suitable for a high silica content preform. A suitable method for forming an intermediate fiber is illustrated in FIG. 7. End 48 of foreproduct 46, which had been closed to prevent contamination of the aperture by dust from the sawing and grinding operations, is severed. A hollow handle 58 is fused to the end of foreproduct 46, the foreproduct aperture being aligned with the handle aperture. Preform foreproduct 46 is then mounted in a conventional draw furnace where the tip thereof is heated by resistance heater 52. A vacuum connection 60 is attached to handle 58, and the preform aperture is evacuated. A glass rod 54, which is attached to the bottom of preform 46, is pulled by motor-driven tractors 62, thereby causing the intermediate fiber 56 to be drawn at a suitable rate. A rate of 15 to 23 cm/min has been found to be adequate. As the intermediate fiber or rod is drawn, the aperture readily closes since the pressure therein is low relative to ambient pressure. The aperture may close somewhat flat whereby the core roundness of the resultant fiber may be adversely affected. The core of the resultant fiber will not be unacceptably out of round if the core-clad ratio of the preliminary consolidated preform 38 is sufficiently high. The average diameter of an intermediate fiber that is to be employed as a mandrel upon which cladding soot is to be deposited is preferable in the range of 4 to 10 mm.

Figure 8:
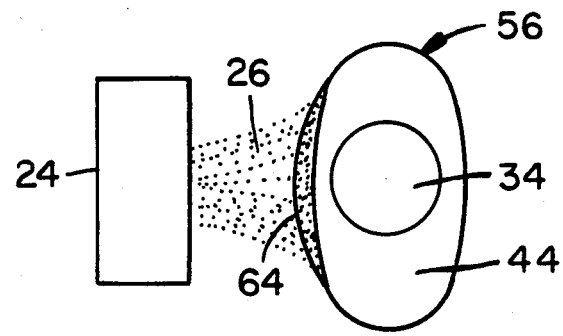
FIGS. 8 and 9 illustrate the application of an outer cladding to the intermediate fiber.
Figure 9:
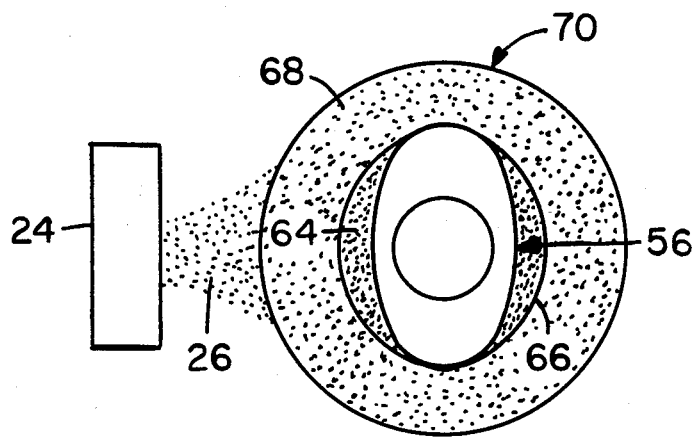

In accordance with one technique for forming the outer cladding layer, longitudinal strips 64 and 66 are initially deposited on the flattened sidewalls of foreproduct 46 to accelerate the formation of a circular outer cladding. With the lathe halted, burner 24 makes a sufficient number of longitudinal passes to form a soot layer 64 as shown in FIG. 8. Foreproduct 46 is rotated 180° and a second soot layer 66 is deposited opposite the first one as shown in FIG. 9. Outer layer 68 of cladding soot is then deposited by rotating foreproduct 46 while burner 24 traverses it longitudinally.

In the preferred embodiment, the steps of depositing strips 64 and 66 of cladding glass are omitted. This does not affect to too great an extent the geometry of the resultant fiber and may improve the uniformity of the deposited outer cladding layer. If cladding layer 68 is deposited directly upon foreproduct 46, the soot stream from the burner will deposit a greater amount of soot when the flat side walls of foreproduct 46 are facing the burner than when the rounded portions thereof are facing the burner since soot collection efficiency is a function of target size. this tends to decrease the noncircularity of the soot blank cross-section as layer 68 is built up. Substantial circularity should be achieved when the outside diameter of layer 68 is sufficient, relative to the size of the core, to enable the resultant fiber to function as a single-mode fiber.

The flame hydrolysis-produced cladding layer is porous in form and must be heated to fuse or consolidate it into a glass layer free from particle boundaries. Consolidation is preferably accomplished by gradually inserting the composite body 70 into a consolidation furnace in the manner taught in U.S. Pat. No. 3,933,454. The resultant glass draw blank 76 may not be circular if layers 64 and 66 are not applied or if they are applied in such a fashion that they do not balance the initial non-circularity of preform foreproduct 46. The amount that the outer surface of consolidated blank 76 deviates from circularity decreases with increasing amounts of outer cladding 68.

Figure 10:
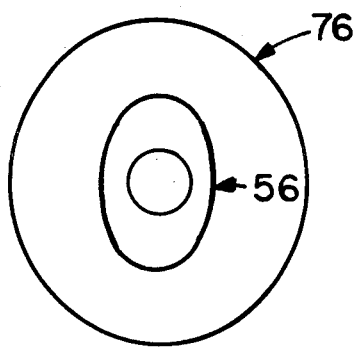
FIG. 10 is a cross-sectional view of the final consolidated preform.
Figure 11:
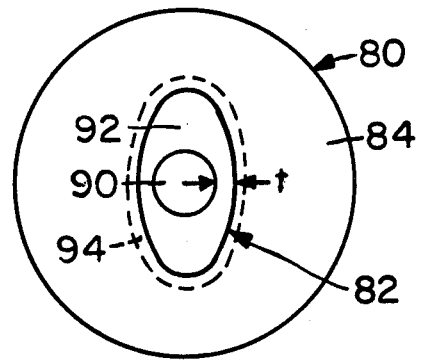
FIG. 11 is a cross-sectional view of an optical fiber drawn from the preform of FIG. 10.

Draw blank 76 of FIG. 10 is inserted into a draw furnace wherein at least an end thereof is heated to a temperature that is sufficiently high to permit fiber 80 of FIG. 11 to be drawn therefrom in accordance with conventional practice. During the drawing of fiber 80, surface tension tends to round the outer surface thereof. The composition of soot layer 68 (and that of strips 64 and 66, if they are deposited) is such that the TCE of the resultant cladding layer 84 is much greater than or much less than the TCE of the remainder of fiber 80. It is known that portion 82 (comprising core 90 and inner cladding 92) will be caused to be in tension if the TCE of the outer or "stress cladding" layer 84 is lower than the effective TCE of portion 82. Conversely, portion 82 will be caused to be in compression if the effective TCE thereof is lower than that of stress cladding layer 84. See the publication: S. T. Gulati and H. E. Hagy, American Ceramic Society 61 260 (1978). Moreover, a stress distribution will exist within the waveguide core 90 in which $\sigma_x < \sigma_y$, where $\sigma_x$ and $\sigma_y$ are the stresses in the core region parallel to and perpendicular to the long axis of portion 82. Furthermore, this stress difference will increase as the aspect ratio of the inner cladding 92 increases and as the minimum thickness t of the inner cladding 92 decreases. This stress differential will produce the desired birefringence.

Although it has been reported that the TCE of the inner cladding must differ from that of the outer cladding by at least $1 \times 10^{-7}$/°C., inner and outer cladding materials are known which result in an expansion difference greater than $15 \times 10^{-7}$/°C. It is reported in UK Patent Application GB 2,104,241 A that the outer clad may consist of $SiO_2$ and the inner elliptical clad may consist of $SiO_2 + B_2O_3$ or $SiO_2$ $GeO_2 + B_2O_3$. It is reported in U.S. Pat. No. 4,360,371 that the outer clad may comprise 30 wt. % $GeO_2 + 70$ wt. % $SiO_2$ when the inner clad is $SiO_2$ and that the inner clad may be $SiO_2$ doped with 1.5 wt. % $P_2O_5$ if the outer clad is $SiO_2$ doped with 7 wt. % $TiO_2$.

A further requirement of the outer stress cladding 84 is that the refractive index thereof should be equal to or slightly greater than that of inner cladding 92. Otherwise, the inner cladding will trap and propagate light which can interfere with light propagated by the core. Furthermore, if the composition of the outer stress cladding is such that it is in tension, it may be advantageous to form a thin layer of low expansion glass such as silica on the outer surface of the fiber.

The following specific example illustrates the manner in which the method of the present invention can be employed to produce an optical waveguide fiber. An integral handle of the type disclosed in U.S. Pat. No. 4,289,522 was employed. A tapered alumina mandrel was inserted into the handle, the central region where soot particles were ultimately deposited being tapered from about 5.5 mm to 6.5 mm. A burner of the type previously described was located 13.7 cm from the mandrel. An acetylene torch supported on the burner was first employed to deposit carbon particles on the mandrel during one burner pass. Liquid $SiCl_4$, liquid $GeCl_4$ and gaseous $BCl_3$ were maintained at 37° C. in first, second and third containers, respectively. These containers were connected to the burner. The burner traversed a 49 cm section of mandrel in 25 seconds.

A thin stratum of $SiO_2$ was initially formed on mandrel 20 in accordance with the teachings of my copending application Ser. No. 427,525. During the formation of this stratum, methane and oxygen flowed from their burner orifices at 6.5 slpm and 5.2 slpm, respectively. Fine layers of silica soot were deposited on the mandrel for thirty minutes during which time oxygen flowed through the first container at a rate of 0.05 slpm to form a stratum of low expansion silica soot having a thickness of about 1 mm.

During the deposition of the preliminary soot preform (comprising soot coatings 16 and 22), oxygen flowed from the inner shield orifices and the outer shield orifices at 1.6 slpm and 2.5 slpm, respectively. During this time, the flow of methane and oxygen from their orifices was 6.9 slpm and 4.9 slpm, respectively.

During the next two hours oxygen was bubbled through the second container at a rate of 0.32 slpm while the flow rate of oxygen to the first container was increased to 1.4 slpm. Thus, a step-index core region of $SiO_2$ doped with 10 weight percent $GeO_2$ was deposited to a thickness of about 12 mm. The flow of oxygen to the second container was then stopped while the rate of oxygen flow to the first container remained at 1.4 slpm to 270 minutes during which time $SiO_2$ soot was deposited to form the inner cladding region of the preliminary soot preform, the outer diameter of which was 70 mm.

The soot preform was removed from the lathe, and the mandrel was removed therefrom, the integral handle remaining at one end thereof. A short section of capillary tubing was inserted into that end of the preform aperture opposite the handle. The preform was then simultaneously dried and consolidated in accordance with the teachings of U.S. Pat. No. 4,125,388. A drying gas consisting of 5 volume percent chlorine, the balance being helium, which flowed through the handle and into the preform aperture. A portion of this drying gas initially flowed through the capillary plug carrying with it water vapor along with reaction products from the drying reaction. As the preform was lowered into the consolidation furnace, through which a helium flushing gas was flowing, the opening in the capillary tube became sealed, and the preform was subjected to gradient consolidation. The flame from a small torch was directed at the central region of the handle portion, and pinched region 48 was formed.

A diamond saw was employed to cut two diametrically opposed, longitudinally-extending regions from the resultant preliminary consolidated preform. The cut surface was ground smooth, the sharp edges were rounded by grinding and the entire surface was polished, thereby forming a preform foreproduct as illustrated in FIG. 6. The diameters of aperture 32 and core 34 were 3.5 and 10 mm, respectively. The maximum diameter of inner core 44 was 38 mm, and the minimum diameter was 15 mm.

Pinched region 48 was severed from the preform foreproduct and another tubular handle was fused thereto. A vacuum connection was attached to the handle, and the aperture of the foreproduct was evacuated. A silica rod was fused to the tip of the preform foreproduct which was then inserted into a draw furnace. The preform was heated to about 1900° C. and pulled downwardly at a rate of about 15 cm/min. The maximum diameter of the resultant intermediate fiber was about 5 mm. After the intermediate fiber had been drawn to a suitable length, a 91 cm long section was broken therefrom.

The intermediate fiber was then supported in the lathe where it functioned as a mandrel for the deposition of outer cladding soot. Oxygen flowed through the first and second containers at rates of 1.4 slpm, 0.38 slpm respectively. Gaseous $BCl_3$ flowed from the third container at a rate of 0.5 slpm. The flow of oxygen from the inner shield orifices remained at 1.6 slpm, but the flow rates of the methane and oxygen to the burner were both increased to 9.0 slpm. The burner traversed the rotating intermediate fiber at a rate of about 2 cm/sec. This was continued until a soot coating having a maximum outside diameter of 60 mm was deposited. The composition of this outer cladding soot was $SiO_2$ doped with about 6 wt. % $GeO_2$ and 9 wt. % $B_2O_3$.

The resultant final preform was gradually inserted into a consolidation furnace having a maximum temperature of 1450° C. where it was consolidated while a mixture of 95 volume percent helium and 5 volume percent chlorine flowed upwardly through the furnace. The resultant optical waveguide preform, the diameter of which was about 35 mm, was inserted into the draw furnace where the tip thereof was subjected to a temperature of about 2100° C. The preform was drawn to form a step-index, single-mode optical waveguide fiber having a core diameter of about 8 $\mu$m. The attenuation of this fiber at 850 nm was about 4.0 dB/km, and the beat length L at that wavelength was about 0.992.

Seeds usually formed at the interface between the inner and outer cladding layers when the high expansion outer cladding material was deposited directly on the surface of the silica inner cladding of the stretched preform foreproduct. Thus, fibers could only be drawn from selected portions of the resultant preform. It was found that such seeds could be eliminated by depositing pure silica soot on the surface of the stretched preform foreproduct to form a continuous silica soot coating prior to depositing the high expansion outer cladding soot. When the pure silica soot was deposited for one hour and the remainder of the process remained essentially as described above, no seeds could be seen in the resultant preform. In the resultant fiber, this silica layer would appear as a thin layer within dashed line 94 of FIG. 11.

I claim:

1. A method of forming a single-mode optical fiber having polarization-retaining characteristics comprising the steps of
   forming a glass preform having a centrally disposed circular core surrounded by a layer of inner cladding glass having a circular cross-sectional configuration, said inner cladding glass having a refractive index lower than that of the core glass,
   removing diametrically opposed regions of said inner cladding glass whereby its cross-sectional configuration changes to one having two opposed rounded sides and two opposed flattened sides, depositing on the outer surface of said inner cladding layer a layer of outer cladding glass particles having a thermal coefficient of expansion which differs from that of the inner cladding layer by at least $1 \times 10^{-7}/C.°$ and which forms a circular outer stress cladding, heating the resultant article to consolidate said layer of glass particles, thereby forming a solid glass draw blank, and drawing said glass draw blank to form a single-mode optical fiber comprising a circular core, an oblong layer of inner cladding glass and a circular outer stress cladding, said inner cladding layer having a high aspect ratio and thin minimum thickness on opposite sides of said core whereby said optical fiber exhibits a of stress-induced birefringence sufficient to form polarization.

2. A method in accordance with claim 1 wherein the step of forming a glass preform comprises depositing on a substantially cylindrical mandrel a coating of core glass particles, depositing on said coating of core glass particles, a coating of inner cladding glass particles, and heating the resultant porous preform to form a dense glass preform.

3. A method in accordance with claim 2 wherein, after the step of removing diametrically opposed regions, the resultant article is heated and elongated to form said preform foreproduct.

4. A method in accordance with claim 1 wherein the step of forming a glass preform comprises depositing on a substantially cylindrical mandrel a coating of core glass particles, depositing on the surface of said core glass particles a coating of inner cladding glass particles, removing said mandrel to form a hollow porous preform, heating said porous preform to a temperature within the consolidation temperature range to form a consolidated dense glass preform having an aperture therethrough, closing both ends of said aperture, said step of removing diametrically opposed regions of said inner cladding glass being performed after said aperture ends have been closed, said method further comprising the steps of severing an end of said dense glass preform to expose said aperture, evacuating said aperture, heating the resultant article and stretching it to cause said aperture to close and to form an intermediate fiber, and severing a suitable long section of said intermediate fiber.

5. A method in accordance with claim 4 wherein the step of removing diametrically opposed regions comprises sawing diametrically opposed regions from said dense glass preform, and grinding the flattened surfaces formed by removing said diametrically opposed regions to smooth roughness caused by said sawing step and to round any sharp corners formed by said sawing step.

6. A method in accordance with claim 1 wherein prior to the step of depositing said layer of outer cladding glass particles, the method comprises the step of depositing a layer of glass particles having the same composition as said inner cladding glass on said inner cladding glass.

7. A method in accordance with claim 1 wherein said inner cladding glass consists of $SiO_2$ and wherein prior to the step of depositing said layer of outer cladding glass particles, the method comprises the step of depositing a layer of $SiO_2$ particles on said inner cladding glass.

8. A method in acordance with claim 5 wherein prior to the step of depositing said layer of outer cladding glass particles, said method comprises the step of etching the surface of said inner cladding layer to remove a thin layer from the surface thereof.

9. A method in accordance with claim 4 wherein, after the step of removing, said method comprises grinding the surface of said inner cladding glass to round any sharp corners theron to form a preform foreproduct having an oblong cross-section.

10. In a method of forming a single-mode optical fiber having polarization-retaining characteristics comprising the steps of depositing on a substantially cylindrical mandrel a coating of core glass particles, depositing on the surface of said core glass particles a coating of inner cladding glass particles, removing said mandrel to form a hollow porous preform having a circular outer surface, heating said porous preform to a temperature within the consolidation temperature range to form a consolidated dense glass preform having an aperture therethrough, closing both ends of said aperture, removing diametrically opposed regions of said inner cladding glass to form a preform foreproduct having two rounded sides and two flattened sides, grinding the flattened surfaces formed by removing said diametrically opposed regions to smooth the surface of said foreproduct and to round any sharp corners thereon to form a preform foreproduct having an oblong cross-section, depositing on said oblong foreproduct a layer of glass particles having the same composition as said inner cladding glass and then, depositing on the surface of the resultant article a layer of glass particles having a thermal coefficient of expansion which differs from that of the inner cladding layer by at least $1 \times 10^{-7}/C.°$ which forms a circular outer stress cladding, heating the resultant article to consolidate said layer of glass particles, thereby forming a solid glass draw blank, and drawing said solid glass draw blank to form a single-mode optical fiber comprising a circular core, on oblong layer of inner cladding glass and a circular outer stress cladding, said inner cladding layer having a high aspect ratio and a thin minimum thickness on opposite sides of said core whereby said optical fiber exhibits stress-induced birefringence sufficient to form polarization, wherein the step of depositing on said oblong foreproduct substantially preventing the formation of seeds at the interface between the inner and outer cladding of said optical fiber.

11. A method in accordance with claim 10 wherein said inner cladding glass is $SiO_2$ and wherein the step of depositing a layer of glass particles having the same composition as said inner cladding glass comprises depositing $SiO_2$ particles.

12. A method in accordance with claim 11 wherein, prior to the step of depositing on said foreproduct a layer of glass particles, said method comprises the step of etching the surface of said inner cladding layer to remove a thin layer from the surface thereof.

* * * * *

UNITED STATES PATENT AND TRADEMARK OFFICE
CERTIFICATE OF CORRECTION

PATENT NO. : 4,578,097
DATED : March 25, 1986
INVENTOR(S) : George E. Berkey

It is certified that error appears in the above—identified patent and that said Letters Patent is hereby corrected as shown below:

Column 8, line 49, "$SiO_2$ $GeO_2$: should be --$SiO_2$ + $GeO_2$--.

Column 11, line 17, "polarization." should be --polarization retaining characteristics.--.

Column 12, line 51, "polarization," should be --polarization retaining characteristics,--.

Signed and Sealed this

Twenty-second Day of July 1986

[SEAL]

Attest:

DONALD J. QUIGG

Attesting Officer

Commissioner of Patents and Trademarks